US008622120B2

(12) United States Patent
Gerundt et al.

(10) Patent No.: US 8,622,120 B2
(45) Date of Patent: Jan. 7, 2014

(54) METHOD FOR INFLUENCING THE TEMPERATURE OF AN ELECTROMECHANICAL COMPONENT AND DEVICE FOR CARRYING OUT THE METHOD

(75) Inventors: Oliver Gerundt, Friolzheim (DE); Oliver Kaefer, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 1056 days.

(21) Appl. No.: 11/988,703

(22) PCT Filed: Jun. 30, 2006

(86) PCT No.: PCT/EP2006/063726
§ 371 (c)(1),
(2), (4) Date: Feb. 6, 2009

(87) PCT Pub. No.: WO2007/006663
PCT Pub. Date: Jan. 18, 2007

(65) Prior Publication Data
US 2009/0179509 A1 Jul. 16, 2009

(30) Foreign Application Priority Data
Jul. 13, 2005 (DE) .......................... 10 2005 032 633

(51) Int. Cl.
*F16H 57/04* (2010.01)

(52) U.S. Cl.
USPC .............. 165/202; 165/42; 165/47; 165/48.1; 165/288; 165/290; 165/294; 165/299; 165/300; 165/916; 74/606 A; 184/6.12; 184/6.22; 184/104.1; 180/65.8; 903/906; 903/909; 903/917

(58) Field of Classification Search
USPC ............ 165/41–43, 202, 253, 179, 287–290, 165/47, 48.1, 299, 300, 294, 916; 310/54; 903/906, 909, 917; 74/606 A; 184/6.12, 184/6.22, 104.1, 104.2, 104.3; 180/65.1, 180/65.8

See application file for complete search history.

(56) References Cited

U.S. PATENT DOCUMENTS

| | | | |
|---|---|---|---|
| 3,874,183 A | | 4/1975 | Tabet et al. |
| 5,181,837 A | * | 1/1993 | Niemiec ........................ 417/350 |
| 5,217,085 A | * | 6/1993 | Barrie et al. ................ 184/104.1 |
| 5,320,501 A | * | 6/1994 | Langosch et al. ............. 417/415 |
| 6,323,613 B1 | * | 11/2001 | Hara et al. ..................... 318/471 |
| 6,817,455 B1 | * | 11/2004 | Gazyakan et al. ............ 188/290 |

(Continued)

FOREIGN PATENT DOCUMENTS

| | | |
|---|---|---|
| DE | 33 43 076 | 6/1986 |
| DE | 199 51 731 | 5/2001 |

(Continued)

*Primary Examiner* — John Ford
(74) *Attorney, Agent, or Firm* — Kenyon & Kenyon LLP

(57) ABSTRACT

A method and a device for influencing the temperature of at least one electromechanical component situated in a motor vehicle, in which a transmission situated in the motor vehicle is cooled by a transmission oil flowing in a transmission cooling circuit. A cooling circuit branch is provided for influencing the temperature of the electromechanical component. The transmission oil also flows in the cooling circuit branch as a heat carrier. The flow rate of the transmission oil in the cooling circuit branch is influenced for influencing the temperature of the electromechanical component as a function of the setpoint operating temperature and/or the actual operating temperature of the electromechanical component.

13 Claims, 3 Drawing Sheets

(56) References Cited

U.S. PATENT DOCUMENTS

| | | |
|---|---|---|
| 7,048,044 B2 * | 5/2006 | Ban et al. .................. 165/202 |
| 7,077,224 B2 * | 7/2006 | Tomatsuri et al. ....... 180/65.235 |
| 2003/0098147 A1 * | 5/2003 | Kemmerer et al. .......... 165/202 |
| 2004/0069546 A1 * | 4/2004 | Lou et al. .................... 180/65.2 |
| 2005/0285457 A1 * | 12/2005 | Tsutsui et al. ................. 310/54 |
| 2006/0043801 A1 * | 3/2006 | Adra ............................... 310/54 |
| 2006/0060345 A1 * | 3/2006 | Flik et al. ..................... 165/297 |

FOREIGN PATENT DOCUMENTS

| | | |
|---|---|---|
| DE | 199 51 735 | 5/2001 |
| DE | 10016640 | 9/2001 |
| EP | 596 000 | 5/1994 |
| EP | 0 736 703 | 10/1996 |
| EP | 1 348 846 | 10/2003 |
| JP | 2003-56681 | 2/2003 |
| JP | 2003-250247 | 9/2003 |
| JP | 2004-358994 | 12/2004 |

* cited by examiner

METHOD FOR INFLUENCING THE TEMPERATURE OF AN ELECTROMECHANICAL COMPONENT AND DEVICE FOR CARRYING OUT THE METHOD

FIELD OF THE INVENTION

The present invention is directed to a method for influencing the temperature of an electromechanical component and to a device for carrying out the method.

BACKGROUND INFORMATION

German Patent Document DE 33 43 076 A1 discusses a device which is provided for cooling an electric motor, which is provided as a drive motor in a motor vehicle, as well as for heating the passenger compartment of a motor vehicle. Fresh air or circulating air may be supplied to the passenger compartment of the motor vehicle as well as to the electric motor. For separating the two air circuits, a heat exchanger is provided which separates cooling of the electric motor from heating the passenger compartment of the motor vehicle. The electric motor may be cooled independently from the heating of the passenger compartment and the passenger compartment may be heated to the extent to which heat is output by the electric motor.

European Patent Document EP 596 000 B1 discusses a cooling circuit for a hybrid vehicle which contains an internal combustion engine, an electric motor, as well as a control circuit for the electric motor. After the start of the motor vehicle, the vehicle may be exclusively driven by the electric motor. The energy dissipation occurring in the control circuit and in the electric motor is used for heating the internal combustion engine for the purpose of shortening the cold-start phase of the internal combustion engine as much as possible. The cooling circuit contains a cooler which prevents an unacceptably high rise in the temperature in the cooling circuit. The cooling circuit contains a conventional coolant of the internal combustion engine as the heat carrier.

German Patent Document DE 199 51 735 A1 discusses a retarder system for supporting the brake of utility vehicles in which a retarder cooling circuit is provided for dissipating the heat generated in the retarder, the retarder cooling circuit containing transmission oil as the heat carrier. The transmission oil flow rate quantity may be increased or decreased independently from the transmission's operating conditions as a function of the mechanical load on the retarder for increasing the cooling performance and at the same time for lowering the temperature of the transmission oil.

A fluid-cooled internal combustion engine, which is situated in a motor vehicle for driving it, for example, is generally cooled by a coolant mixture of water and glycol, for example; the setpoint operating temperature of the internal combustion engine may be in a range of 90° C. to 110° C., for example.

Automatic transmissions in particular generally contain an oil pump in order to operate the actuators in the transmission via oil pressure and to ensure the lubrication of the transmission. A transmission oil cooling circuit may be provided due to the possible higher heat losses of automatic transmissions compared to normal manual transmissions. The operating temperature of a transmission is between 60° C. and 90° C., for example.

SUMMARY OF THE INVENTION

An object of the exemplary embodiment and/or exemplary method of the present invention is to provide a method for influencing the temperature of an electromechanical component as well as a device for carrying out the method which make a high efficiency possible.

The object may be achieved by the features described herein.

The method according to the present invention for influencing the temperature of at least one electromechanical component situated in a motor vehicle, in which a transmission situated in the motor vehicle is cooled using transmission oil which flows in a transmission cooling circuit, in which a cooling circuit branch for influencing the temperature of the electromechanical component is also provided, in which the transmission oil also flows as a heat carrier, provides that the flow rate of the transmission oil in the cooling circuit branch for influencing the temperature of the electromechanical component is influenced as a function of the setpoint operating temperature and/or the actual operating temperature of the electromechanical component.

The setpoint operating temperature is not only considered as an entirely defined temperature, but it rather generally relates to a predefined setpoint temperature range which is also referred to in the following as the setpoint operating temperature.

The method according to the present invention makes reaching the setpoint operating temperature of the electromechanical component as well as maintaining the setpoint operating temperature in continuous operation possible. This ensures that the electromechanical component is operated with the greatest possible efficiency which occurs at the setpoint operating temperature. In particular, the method according to the present invention makes it possible that the actual operating temperature of the electromechanical component is limited upward.

A further advantage of the method according to the present invention arises from a reduction of the necessary expenses for implementing the cooling circuits by partial use of the existing transmission cooling circuit components by the cooling circuit branch.

The method according to the present invention makes cooling as well as heating of the electromechanical component possible as a function of the temperature of the transmission oil used as the heat carrier.

Advantageous refinements and embodiments of the method according to the present invention arise from further features described herein.

One embodiment provides that the flow rate of the transmission oil in the cooling circuit branch is regulated to the setpoint operating temperature of the electromechanical component. Due to this measure, maintaining the setpoint operating temperature in continuous operation is ensured. In particular, sufficient cooling of the electromechanical component may always be achieved using this measure.

One embodiment, which results in component savings, provides that the transmission oil flowing in the cooling circuit branch is withdrawn from the transmission cooling circuit. This reduces the expenses for pipes and/or hoses in particular.

One embodiment provides that the flow rate of the transmission oil in the cooling circuit branch is influenced independently from the flow rate in the transmission cooling circuit. Using this measure, the options for influencing the temperature of the transmission on the one hand and of the electromechanical component on the other hand are separated from one another.

Another embodiment provides that the flow rate of the transmission oil in the cooling circuit branch is influenced as a function of the difference between the actual temperature of the electromechanical component and the transmission oil temperature. This measure ensures that, at a transmission oil temperature which is too high, the electromechanical component is not heated to a temperature above the setpoint operating temperature.

One embodiment provides that the transmission oil heated by the transmission is used for increasing the temperature of an electromechanical component which has an optimum degree of efficiency at a higher setpoint operating temperature compared to the ambient temperature. It is generally to be assumed that heating of the transmission has priority so that this embodiment advantageously becomes relevant only when the transmission setpoint operating temperature has already been reached or even a decrease of the temperature of the transmission oil is necessary. The heat loss occurring in the transmission may then be used to bring the electromechanical component to its setpoint operating temperature as quickly as possible and thus into the temperature range of the highest degree of efficiency. If heating of the electromechanical component due to its heat loss takes place quicker than heating of the transmission, a corresponding increase in the temperature in the transmission to the transmission setpoint operating temperature using the heat loss of the electromechanical component is already ensured due to the connection of the two cooling circuits.

The device according to the present invention for carrying out the method initially concerns a control unit which is designed for carrying out the method. The control unit may contain at least one electrical memory in which the method steps are stored as a computer program.

An advantageous embodiment of the device according to the present invention provides that the electromechanical component is at least one electric motor. The electric motor may be used as a drive motor in a motor vehicle, for example. In particular, a hybrid vehicle which contains at least one internal combustion engine in addition to the at least one electric motor may be operated with a high degree of efficiency using the approach according to the exemplary embodiment and/or exemplary method of the present invention.

One embodiment provides that the electric motor drives at least one oil pump for the transmission oil in the cooling circuit branch and/or in the transmission cooling circuit for providing the flow rate. Using this measure, a separate drive for sustaining the flow rate is dispensed with.

Simple implementation of the device according to the present invention is made possible by the fact that a control valve which influences the flow rate in the cooling circuit branch as a function of the actual temperature of the electromechanical component is situated in the transmission cooling circuit.

An alternative embodiment provides that the cooling circuit branch contains a separate oil pump with which the flow rate in the cooling circuit branch may be influenced independently from the flow rate in the transmission cooling circuit.

A further embodiment provides the use of at least one oil cooler which possibly has a bypass. Sufficient cooling performance of both the transmission cooling circuit and the cooling circuit branch may be ensured through this measure in particular.

Additional advantageous refinements and embodiments of the approach according to the present invention arise from the additional features described herein and from the following description.

DETAILED DESCRIPTION

Figure 1:
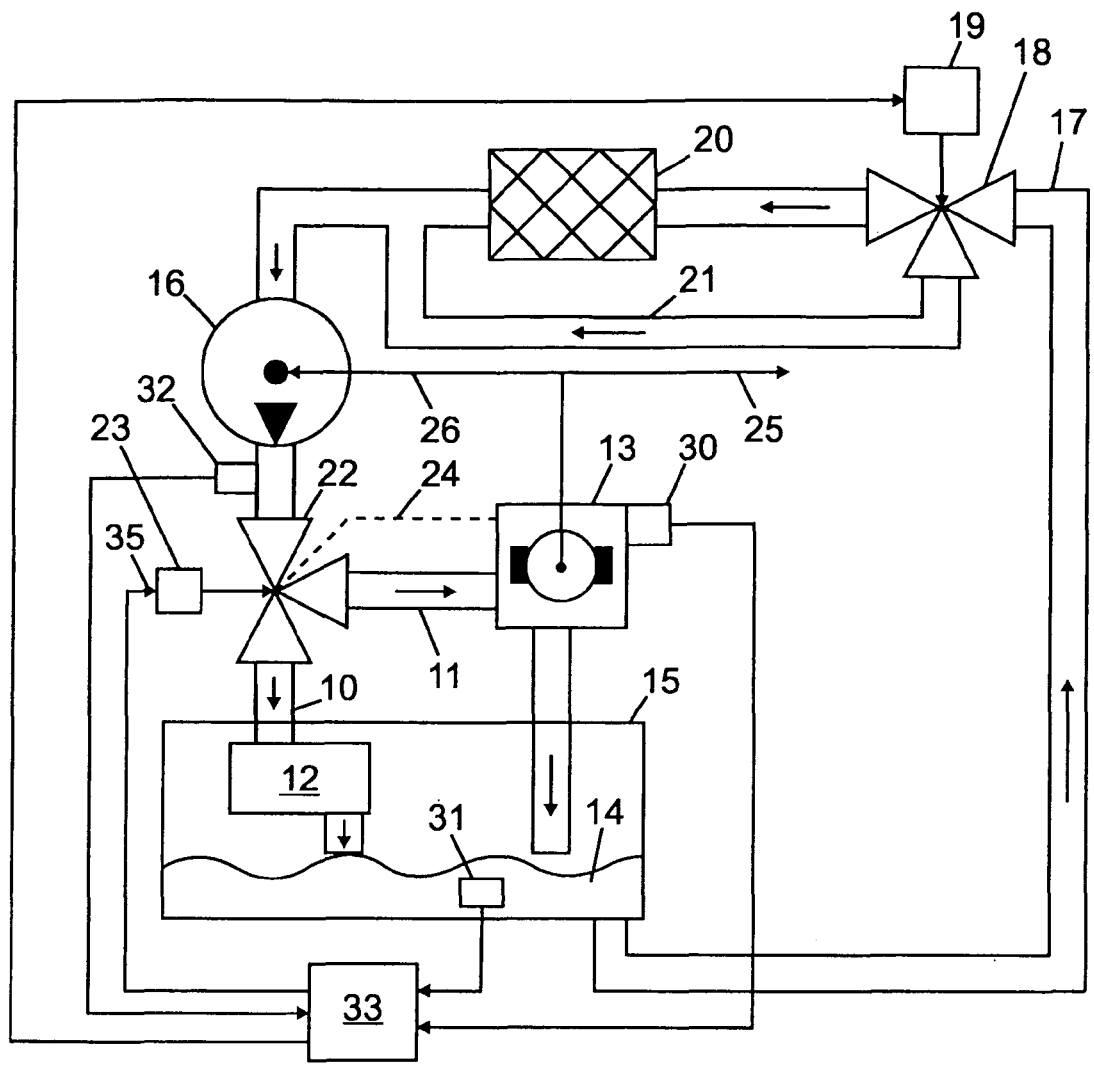
FIG. 1 shows a first exemplary embodiment of a device for influencing the temperature of at least one electromechanical component situated in a motor vehicle.

FIG. 1 shows a transmission cooling circuit 10 and a cooling circuit branch 11. Transmission cooling circuit 10 is provided for influencing the temperature of a transmission 12 and cooling circuit branch 11 is provided for influencing the temperature of an electromechanical component 13. Both cooling circuits 11, 12 contain transmission oil 14 as a heat carrier which is collected in an oil sump 15.

A first oil pump 16, which intakes transmission oil 14 via an intake line 17 and conveys it to a valve 18, is provided for making a flow rate of transmission oil 14 available in both cooling circuits 10, 11. Valve 18, operated by an actuator 19, conveys the transmission oil to a control valve 22 via an oil cooler 20 and/or via a bypass 21 bypassing oil cooler 20. Control valve 22, operated by a second actuator 23, divides the transmission oil between transmission cooling circuit 10 and cooling circuit branch 11.

Line 24, between electromechanical component 13 and control valve 22, symbolizes a thermal connection between electromechanical component 13 and control valve 22.

Electromechanical component 13 is connected to a load (not shown in detail) to be operated or driven by electromechanical component 13 via a first clutch 25 and mechanically connected to a first oil pump 16 via a second clutch 26.

The temperature of electromechanical component 13 is detected by a first temperature sensor 30, the temperature of transmission oil 14 in oil sump 15 is detected by a second temperature sensor 31, and the temperature upstream from control valve 22 and downstream from oil cooler 20 is detected by a third temperature sensor 32. Temperature sensors 30 through 32 are connected to control unit 33 which emits a first actuating signal 34 to first actuator 19 and a second actuating signal 35 to second actuator 23.

Figure 2:
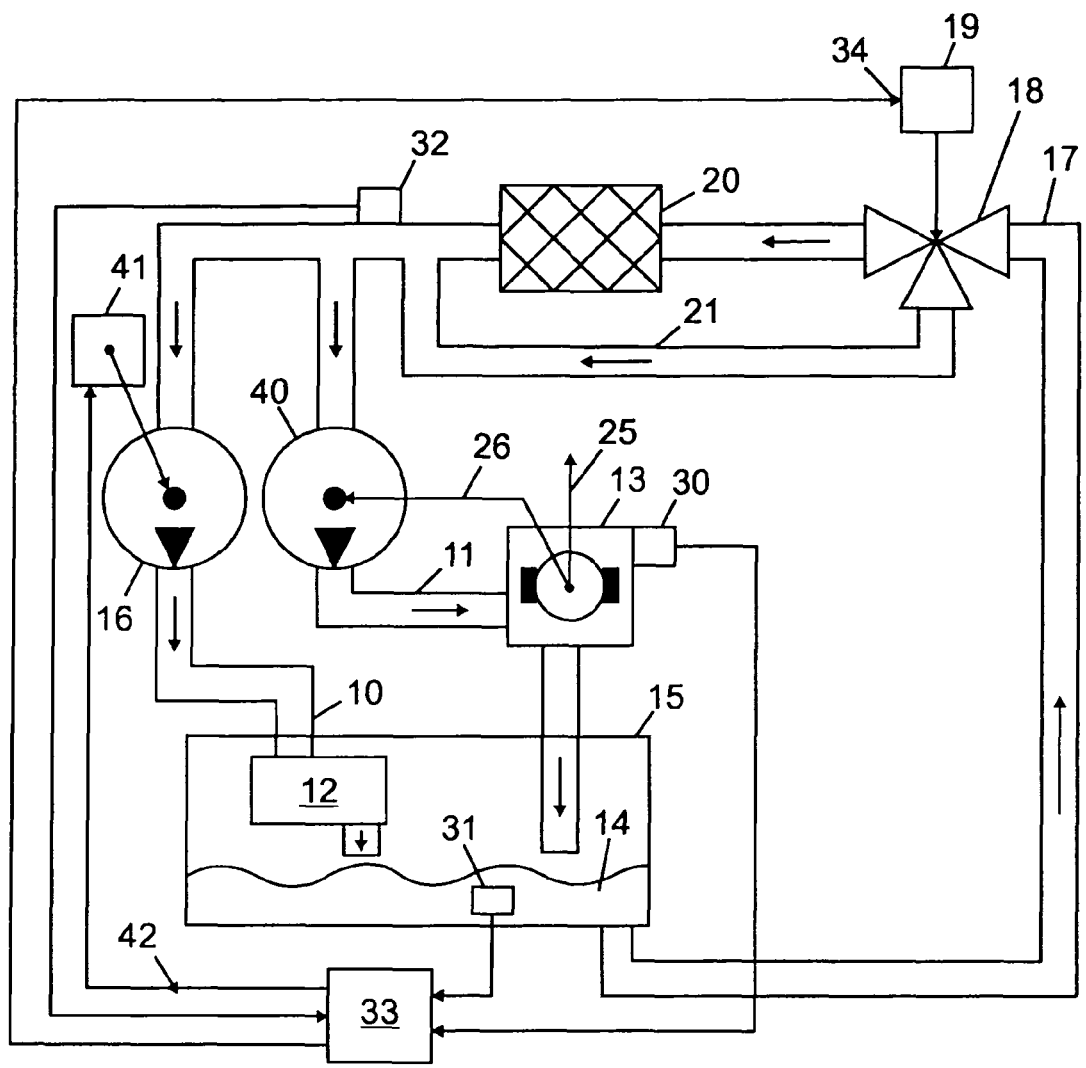
FIG. 2 shows an alternative embodiment of the device.

FIG. 2 shows an alternative embodiment, the parts shown in FIG. 2 which correspond to the parts shown in FIG. 1 carrying the same reference numerals. The essential difference between the exemplary embodiments is the fact that cooling circuit branch 11 of the second exemplary embodiment has a separate oil pump 40. Moreover, first oil pump 16 is driven by an oil pump drive 41 which receives a control signal 42 provided by control unit 33. In contrast to the first exemplary embodiment, control valve 22 is omitted. The second mechanical clutch connects electromechanical component 13 to separate oil pump 40.

Figure 3:
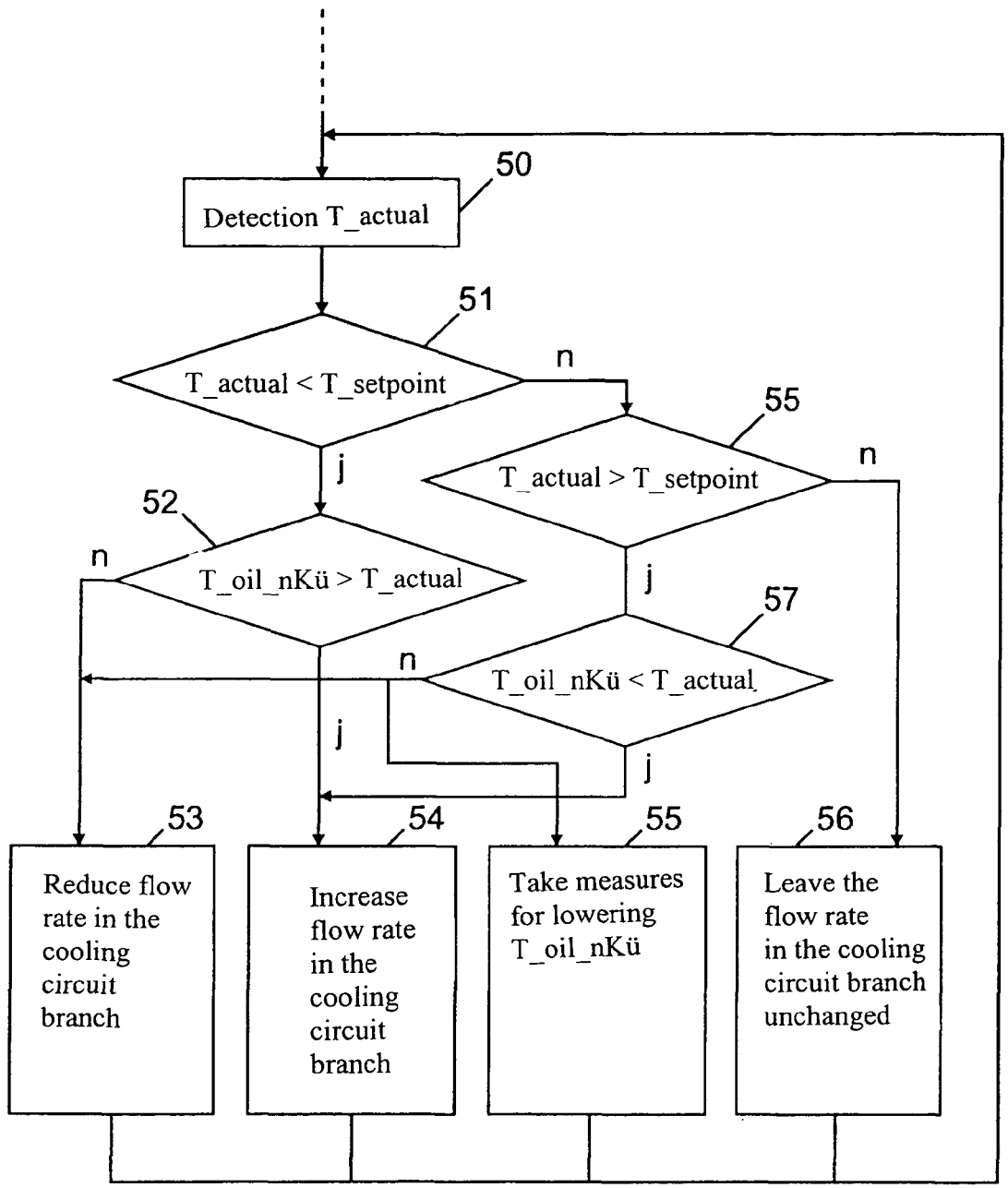
FIG. 3 shows a flow chart of a method according to the present invention.

FIG. 3 shows a flow chart of the method according to the present invention which starts according to a first function block 50 with a detection of actual temperature T_actual of electromechanical component 13. In a first query 51 it is checked whether actual operating temperature T_actual of electromechanical component 13 is lower than its setpoint operating temperature T_setpoint.

If this is the case, it is checked in a second query 52 whether transmission oil temperature T_oil_nKü downstream from oil cooler 20 is higher than actual operating temperature T_actual of electronic component 13.

If this not the case, the program jumps to a second function block 53 according to which the flow rate in cooling circuit branch 11 is reduced. If this is the case, the program jumps to a third function block 54 according to which the flow rate in cooling circuit branch 11 is increased.

If it is ascertained in first query 51 that actual operating temperature T_actual is not lower than setpoint operating temperature T_setpoint, it is ascertained in a third query 55 whether actual operating temperature T_actual is higher than setpoint operating temperature T_setpoint. If this is not the case, the flow rate in cooling circuit branch 11 remains unchanged according to a fourth function block 56. If this is the case, it is checked in a fourth query 57 whether transmission oil temperature T_oil_nKü downstream from oil cooler 20 is lower than actual operating temperature T_actual. If this is not the case, the program branches to second function block 53. At the same time, measures provided in a fifth function block 58 are taken for lowering transmission oil temperature T_oil_nKü downstream from oil cooler 20. If transmission oil temperature T_oil_nKü downstream from oil cooler 20 is lower than actual operating temperature T_actual, the program jumps to third function block 54.

The method according to the present invention works as follows:

Transmission oil cooling circuit 10 is provided for influencing the temperature of transmission 12. Transmission oil cooling circuit 10 is provided in particular for cooling transmission 12 in order to hold transmission 12 in continuous operation at a transmission setpoint operating temperature which is between 60° C. and 90° C., for example. Transmission cooling circuit 10 contains intake line 17 which aspires transmission oil 14 which is collected in oil sump 15.

Transmission oil 14 flowing in intake line 17 may be cooled in oil cooler 20. Oil cooler 20 is a heat exchanger, for example, which dissipates the heat into the ambient air. Oil cooler 20 may be a heat exchanger which dissipates the heat to another coolant such as the coolant of an internal combustion engine (not shown in detail).

According to one refinement it may be provided that transmission oil 14 bypasses oil cooler 20 via bypass 21 at low temperatures. The division of transmission oil 14 between oil cooler 20 and/or bypass 21 is carried out by valve 18 which is actuated by first actuator 19 which is controlled by first control signal 34 which is provided by control unit 33 as a function of, in particular, transmission oil temperature T_oil_nKü downstream from oil cooler 20 detected by third temperature sensor 32.

Via control valve 22, transmission oil 14 reaches transmission 12 whose temperature is to be influenced, in particular to be lowered. For example, control valve 22 is actuated as a function of second control signal 35, second control signal 35 being a function of the temperature of electromechanical component 13 in particular which is detected by first temperature sensor 30, for example. Instead of measuring the temperature of electromechanical component 13, the operating temperature of electromechanical component 13 may be estimated in control unit 33 as a function of electrical operating parameters and/or the operating time of electromechanical component 13 and/or the ambient temperature and/or additional variables known to control unit 33.

Second actuator 23 is omitted according to one advantageous embodiment. Control valve 22 may be designed as a thermovalve, for example, which is thermally connected to electromechanical component 13. The thermal connection is indicated in FIG. 1 with line 24. Due to the thermal connection, control valve 22 divides transmission oil 14 between transmission 20 and electromechanical component 13 as a function of actual temperature T_actual of electromechanical component 13.

The flow rate in cooling circuit branch 11 may be regulated in such a way that the predefined setpoint operating temperature T_setpoint of electromechanical component 13 is maintained in order to keep electromechanical component 13 in continuous operation in the range of its optimum degree of efficiency.

If the temperature of electromechanical component 13 is below setpoint operating temperature T_setpoint and the transmission oil temperature is higher, it may be provided according to one embodiment that transmission oil 14, flowing in cooling circuit branch 11, is used for quickly heating electromechanical component 13 to setpoint operating temperature T_setpoint. This measure may be provided in particular when the transmission setpoint operating temperature has already been reached. For this purpose, control valve 22 is operated in particular as a function of the difference between the transmission oil temperature and actual temperature T_actual and as a function of setpoint operating temperature T_setpoint.

In first query 51 it is ascertained whether actual operating temperature T_actual is lower than setpoint operating temperature T_setpoint. If this is the case, it is checked in second query 52 whether transmission oil temperature T_oil_nKü downstream from oil cooler 20 is higher than actual operating temperature T_actual. If this is not the case, the program branches to second function block 53 according to which the flow rate in cooling circuit branch 11 is reduced in order to not cool down electromechanical component 13 to an unnecessary extent. However, if this is the case, the flow-through in cooling circuit branch 11 may be increased according to third function block 54 in order to increase the temperature of electromechanical component 13 to setpoint operating temperature T_setpoint as quickly as possible. As mentioned earlier, this measure is only meaningful when the transmission setpoint operating temperature has already been reached and additional heat energy is available.

If it is ascertained in first query 51 that actual operating temperature T_actual is not lower than setpoint operating temperature T_setpoint, it is furthermore checked in third query 55 whether actual operating temperature T_actual is higher than setpoint operating temperature T_setpoint. This check is particularly appropriate when setpoint operating temperature T_setpoint corresponds to a predefined setpoint temperature range, so that there may be a larger range in which actual operating temperature T_actual is equal to setpoint operating temperature T_setpoint. If this is the case, the program branches to fourth function block 56 according to which the flow rate in the cooling circuit branch remains unchanged since electromechanical component 13 has reached and should continue to maintain its setpoint operating temperature T_setpoint.

However, if it is ascertained in third query 55 that actual operating temperature T_actual is higher than setpoint operating temperature T_setpoint, it is checked in fourth query 57 whether transmission oil temperature T_oil_nKü downstream from oil cooler 20 is lower than actual operating temperature T_actual. If this not the case, the program branches back to function block 53 according to which the flow rate in cooling circuit branch 11 is reduced in order to not further increase actual operating temperature T_actual which is already too high. However, if it is ascertained in fourth query 57 that transmission oil temperature T_oil_nKü downstream from oil cooler 20 is lower than actual operating temperature T_actual, the program branches to second function block 54 according to which an increase in the flow rate in cooling circuit branch 11 is provided for cooling electromechanical component 13 down to setpoint operating temperature T_setpoint.

Based on a measurement or at least an estimation of actual operating temperature T_actual of electromechanical component 13 and/or possibly the transmission oil temperature in oil sump 15 and possibly transmission oil temperature T_oil_nKü downstream from oil cooler 20, setpoint operating temperature T_setpoint of electromechanical component 13 may be regulated instead of being controlled.

According to an exemplary embodiment, at least one electric motor is provided as electromechanical component 13 which may be used as a drive motor in a motor vehicle. This makes it possible to design the motor vehicle as a hybrid motor vehicle which contains in addition to the at least one drive electric motor at least one internal combustion engine which may, on the one hand, provide drive power and, on the other hand, electrical power for charging a battery. The use of electromechanical component 13 for driving a motor vehicle is symbolically indicated in FIG. 1 by first mechanical clutch 25.

According to one embodiment it is provided that electromechanical component 13, designed as an electric motor, drives first oil pump 16 via second mechanical clutch 26, so that a separate drive for first oil pump 16 may be omitted.

If actual temperature T_actual of electromechanical component 13 to be cooled is already in the range of its setpoint temperature T_setpoint, but the temperature of transmission 12 is still below the transmission setpoint operating temperature, transmission cooling circuit 10 may then be used in a targeted manner for increasing the temperature of transmission 12.

In the exemplary embodiment shown in FIG. 2, cooling circuit branch 11 contains separate oil pump 40 which may be operated independently from first oil pump 16. While in this exemplary embodiment separate oil pump 40 may be driven via second mechanical clutch 26 of electromechanical component 13 designed as an electric motor, oil pump drive 41, an electric motor for example, may be provided for driving first oil pump 16.

Also in this exemplary embodiment, regulation of setpoint operating temperature T_setpoint may be provided in which actual operating temperature T_actual is either measured or at least estimated using first temperature sensor 30. In addition, the temperature of transmission oil 14 in oil sump 15 and in particular transmission oil temperature T_oil_nKü downstream from oil cooler 20 which may be either measured or at least estimated using third temperature sensor 32 may be taken into account.

Due to separate oil pump 40, control valve 22 shown in FIG. 1 is omitted. The essential advantage obtained thereby is that the flow rate in cooling circuit branch 11 may be set independently from the flow rate in transmission cooling circuit 10. Control and regulation to setpoint operating temperature T_setpoint of electromechanical component 13 according to the second exemplary embodiment corresponds again to control and regulation to setpoint operating temperature T_setpoint explained based on FIG. 3, so that in this exemplary embodiment also either cooling or possibly heating of the transmission as well as of electromechanical component 13 is possible.

Reference Numerals in FIG. 3 are as Follows:
50=detection T_actual
51=T_actual<T_setpoint
55=T_actual>T_setpoint
52=T_oil_nKü>T_actual
57=T_oil_nKü<T_actual
53=reduce flow rate in the cooling circuit branch
54=increase flow rate in the cooling circuit branch
55=take measures for lowering T_oil_nKü
56=leave the flow rate in the cooling circuit branch unchanged

What is claimed is:

1. A method for influencing a temperature of at least one electromechanical component in a motor vehicle in which a transmission in the motor vehicle is cooled in a transmission cooling circuit, the method comprising:
    cooling the transmission oil flowing in the transmission cooling circuit; and
    influencing the temperature of the electromechanical component by a cooling circuit branch, in which the transmission oil also flows as a heat carrier, wherein the flow rate of the transmission oil in the cooling circuit branch is influenced as a function of at least one of a setpoint operating temperature and an actual operating temperature of the electromechanical component, and wherein the flow rate of the transmission oil in the cooling circuit branch is influenced as a function of a temperature of the transmission oil unless the actual operating temperature of the electromechanical component is equal to the setpoint operating temperature.

2. The method of claim 1, wherein the flow rate of the transmission oil in the cooling circuit branch is regulated to the setpoint operating temperature of the electromechanical component.

3. The method of claim 2, wherein the flow rate of the transmission oil in the cooling circuit branch is influenced independently from the flow rate in the transmission cooling circuit.

4. The method of claim 1, wherein the flow rate of the transmission oil in the cooling circuit branch is influenced so that the actual operating temperature of the electromechanical component is limited.

5. The method of claim 1, wherein the transmission oil flowing in the cooling circuit branch is withdrawn from the transmission cooling circuit.

6. The method of claim 1, wherein the flow rate of the transmission oil in the cooling circuit branch is influenced as a function of a difference between the actual temperature of the electromechanical component and the transmission oil temperature.

7. The method of claim 1, wherein the flow rate of the transmission oil in the cooling circuit branch remains unchanged if the actual operating temperature of the electromechanical component is equal to the setpoint operating temperature.

8. A device for influencing a temperature of at least one electromechanical component in a motor vehicle in which a transmission in the motor vehicle is cooled in a transmission cooling circuit, comprising:
    at least one control unit for executing performance of the following:
        cooling the transmission oil flowing in the transmission cooling circuit; and
        influencing the temperature of the electromechanical component by a cooling circuit branch, in which the transmission oil also flows as a heat carrier, wherein the flow rate of the transmission oil in the cooling circuit branch is influenced as a function of at least one of a setpoint operating temperature and an actual operating temperature of the electromechanical component, and wherein the flow rate of the transmission oil in the cooling circuit branch is influenced as a function of a temperature of the transmission oil unless the actual operating temperature of the electromechanical component is equal to the setpoint operating temperature.

9. The device of claim 8, wherein the at least one electromechanical component includes an electric motor.

10. The device of claim 9, wherein the electric motor drives at least one oil pump for the transmission oil in at least one of the cooling circuit branch and in the transmission cooling circuit for providing the flow rate.

11. The device of claim 8, wherein a control valve is situated in the transmission cooling circuit which influences the flow rate in the cooling circuit branch as a function of the actual temperature of the electromechanical component.

12. The device of claim 8, wherein the cooling circuit branch includes a separate oil pump.

13. The device of claim 8, further comprising: an oil cooler.

* * * * *

UNITED STATES PATENT AND TRADEMARK OFFICE
CERTIFICATE OF CORRECTION

PATENT NO.         : 8,622,120 B2
APPLICATION NO. : 11/988703
DATED              : January 7, 2014
INVENTOR(S)        : Gerundt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1567 days.

Signed and Sealed this
Twenty-second Day of September, 2015

Michelle K. Lee
*Director of the United States Patent and Trademark Office*